United States Patent
Hashiya

(10) Patent No.: US 9,953,235 B2
(45) Date of Patent: Apr. 24, 2018

(54) IMAGE PICKUP DEVICE, VEHICLE NUMBER IMAGE PICKUP DEVICE, AND IMAGE PICKUP METHOD

(71) Applicant: Kabushiki Kaisha Toshiba, Tokyo (JP)

(72) Inventor: Seiichi Hashiya, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 37 days.

(21) Appl. No.: 14/853,345

(22) Filed: Sep. 14, 2015

(65) Prior Publication Data
US 2016/0004922 A1    Jan. 7, 2016

Related U.S. Application Data

(63) Continuation of application No. PCT/JP2013/004544, filed on Jul. 26, 2013.

(30) Foreign Application Priority Data

Mar. 15, 2013    (JP) .................... 2013-053276

(51) Int. Cl.
G06K 9/00    (2006.01)
G06K 9/32    (2006.01)
(Continued)

(52) U.S. Cl.
CPC ............ *G06K 9/3258* (2013.01); *G06K 9/78* (2013.01); *G06T 7/215* (2017.01); *G08G 1/0175* (2013.01);
(Continued)

(58) Field of Classification Search
None
See application file for complete search history.

(56) References Cited

U.S. PATENT DOCUMENTS 5,734,337 A * 3/1998 Kupersmit ............... G01P 3/38
340/936
6,281,928 B1 * 8/2001 Umezaki ............... G06T 7/0042
348/148
(Continued)

FOREIGN PATENT DOCUMENTS

JP    2001-273461 A    10/2001
JP    2004-094412 A    3/2004
(Continued)

OTHER PUBLICATIONS

International Search Report issued in related PCT Application No. PCT/JP2013/004544 dated Sep. 17, 2013, 3 pages (with translation).

*Primary Examiner* — Hadi Akhavannik
(74) *Attorney, Agent, or Firm* — Baker Botts L.L.P.

(57) ABSTRACT

A vehicle number image pickup device includes an image pickup means for taking an image including identification information for identifying a vehicle in a predetermined frame period, an image division means for dividing each frame image obtained from the image pickup means into at least two images, a difference processing means for determining whether a different is present between frame images divided by the image division means, and an image output means for successively outputting the divided frame images for each frame when the different is determined to be present between the frame images by the difference processing means.

3 Claims, 7 Drawing Sheets

(51) Int. Cl.
   *G08G 1/017* (2006.01)
   *G06K 9/78* (2006.01)
   *G06T 7/215* (2017.01)
(52) U.S. Cl.
   CPC ..... *G06K 2209/01* (2013.01); *G06K 2209/15* (2013.01); *G06T 2207/20224* (2013.01); *G06T 2207/30236* (2013.01)

(56) References Cited

U.S. PATENT DOCUMENTS

| | | | | |
|---|---|---|---|---|
| 6,628,804 | B1* | 9/2003 | Edanami | G01P 3/806 |
| | | | | 382/104 |
| 6,754,369 | B1* | 6/2004 | Sazawa | G06K 9/3266 |
| | | | | 382/105 |
| 7,920,716 | B2* | 4/2011 | Sato | G06K 9/3241 |
| | | | | 382/103 |
| 8,229,171 | B2* | 7/2012 | Takahashi | G06K 9/00771 |
| | | | | 382/104 |

FOREIGN PATENT DOCUMENTS

| | | |
|---|---|---|
| JP | 2009-111885 A | 5/2009 |
| JP | 2010-206592 A | 9/2010 |
| JP | 2012-221272 A | 11/2012 |

\* cited by examiner

FIG. 8

| FRAME | 1 | | 2 | | 3 | | 4 | | 5 | | 6 | |
|---|---|---|---|---|---|---|---|---|---|---|---|---|
| STORED DIVIDED IMAGE | UP | LO | UP | LO | UP | LO | UP | LO | UP | LO | UP | LO |
| PRESENCE/ABSENCE OF DIFFERENCE | 0 | 0 | 1 | 1 | 1 | 1 | 0 | 0 | 1 | 0 | 1 | 0 |
| THE NUMBER OF STORED IMAGES | 0 | | 2 | | 3 | | 2 | | 2 | | 2 | |
| IMAGE TO BE FORWARDED | | | 2UP | | | 2LO | | 3UP | | 3LO | | 5UP |

IMAGE PICKUP DEVICE, VEHICLE NUMBER IMAGE PICKUP DEVICE, AND IMAGE PICKUP METHOD

CROSS-REFERENCE TO RELATED APPLICATION

This application is based upon claims the benefit of priority from the prior Japanese Patent Application No. 2013-053276, filed on Mar. 15, 2013, the entire contents of which are incorporated herein by reference. This application is a continuation application of International Application No. PCT/JP2013/004544 filed on Jul. 26, 2013.

FIELD

The present embodiments relate to an image pickup device, a vehicle number image pickup device, and an image pickup method.

BACKGROUND

A license plate reader that reads a license plate (vehicle number) of a vehicle running on a toll collection lane (road) of a tollgate is used in a toll collection system referred to as an ETC (registered trademark) system for automatically collecting a toll nonstop with respect to a vehicle running on a toll road such as an expressway.

The license plate reader takes an image of a license plate (vehicle number) from a front or a rear of a running vehicle, and recognizes the vehicle number on the license plate by processing the obtained image. A vehicle number image pickup device that takes the image of the vehicle number is used.

Recently, referring to the vehicle number image pickup device, a high-resolution camera of 2,000 pixels or more in a horizontal direction has come into the market as an image pickup means for taking the image of the vehicle number (license plate) such that a resolution sufficient to read the vehicle number can be obtained even when an image of a wide field of 1 lane or more (1 lane is about 3.5 m) is taken.

In addition, even though a digitized image is output from the high-resolution camera, a camera of a high dynamic range having a digital output of 12 bits or more has also come into the market, and there is a possibility that complex exposure control is unnecessary. However, in terms of versatility, processing time, and cost, it is not practical to use such a large-capacity image.

On the other hand, there is a publically known scheme in which a vehicle is detected from images continuously sent from a camera, only an image of a license plate portion is extracted from the detected vehicle image, and the extracted image is used as a vehicle number recognition image.

However, in such a technology, in general, an extremely short time is taken from when an approaching vehicle is detected until an image of a vehicle number is taken, and thus it is difficult to achieve high-performance image processing for a short period of time. As a result, there is a risk that an accurate position of a license plate may not be extracted.

BRIEF DESCRIPTION OF DRAWINGS

FIG. 8 is a diagram illustrating a specific example of divided images stored in the image storage unit, the presence/absence of a difference between frames, the number of stored images, and a state of a forwarded image;

EMBODIMENTS TO PRACTICE THE INVENTION

A vehicle number image pickup device according to an embodiment includes an image pickup means for taking an image including identification information for identifying a vehicle in a predetermined frame period, an image division means for dividing each frame image obtained from the image pickup means into at least two images, a difference processing means for determining whether a different is present between frame images divided by the image division means, and an image output means for successively outputting the divided frame images for each frame when the different is determined to be present between the frame images by the difference processing means.

The above-described embodiment may provide an image pickup device which enables accurate and concise reading of vehicle identification through general image processing.

Hereinafter, a description will be given of the vehicle number image pickup device according to the embodiment with reference to drawings.

First, a first embodiment will be described.

Figure 1:
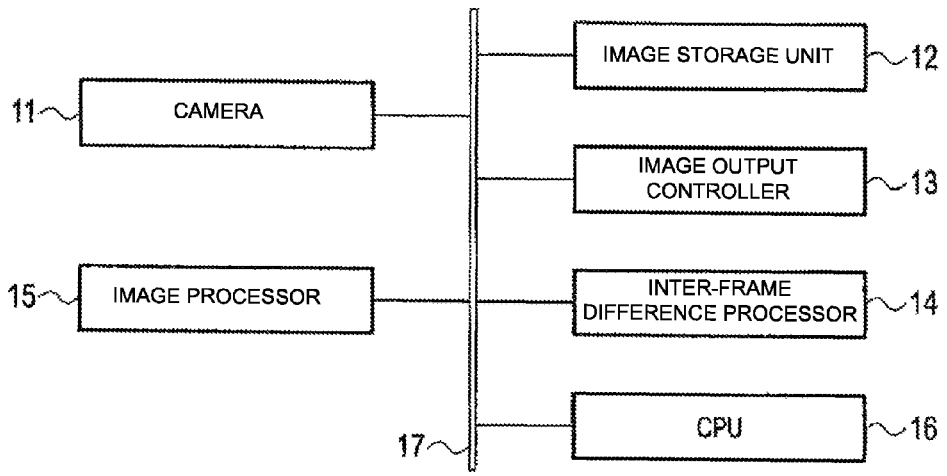
FIG. 1 is a block diagram schematically illustrating a configuration of a license plate reader to which a vehicle number image pickup device according to a first embodiment is applied.

FIG. 1 schematically illustrates a configuration of a license plate reader to which a vehicle number image pickup device according to the first embodiment is applied. The license plate reader according to the first embodiment is configured by a video camera (hereinafter, simply referred to as a camera) 11 as an image pickup means, an image storage unit 12, an image output controller 13, an inter-frame difference processor 14, an image processor 15, a central processing unit (CPU) 16 that manages overall control, and a data bus and address bus 17 that connects the above units such that the units can communicate with one another.

Hereinafter, the respective units will be described in detail.

The camera 11 takes an image including at least a license plate (vehicle number) in a predetermined frame period from a front (or a rear) of a vehicle that runs on a toll collection lane (road) of a tollgate, and outputs the image as a digitized frame image. In the present embodiment, it is more desirable to use a high-resolution camera having 2,000 pixels or more in a horizontal direction, a digital output of 12 bits or more, and a frame rate of 30 fps or more. For example, the camera may be implemented by an industrial camera for factory automation (FA)/monitoring use.

The image storage unit 12 mainly stores divided frame images as described below. For example, it is desirable to use a high-capacity hard disk drive (HDD) and the like.

Figure 2:
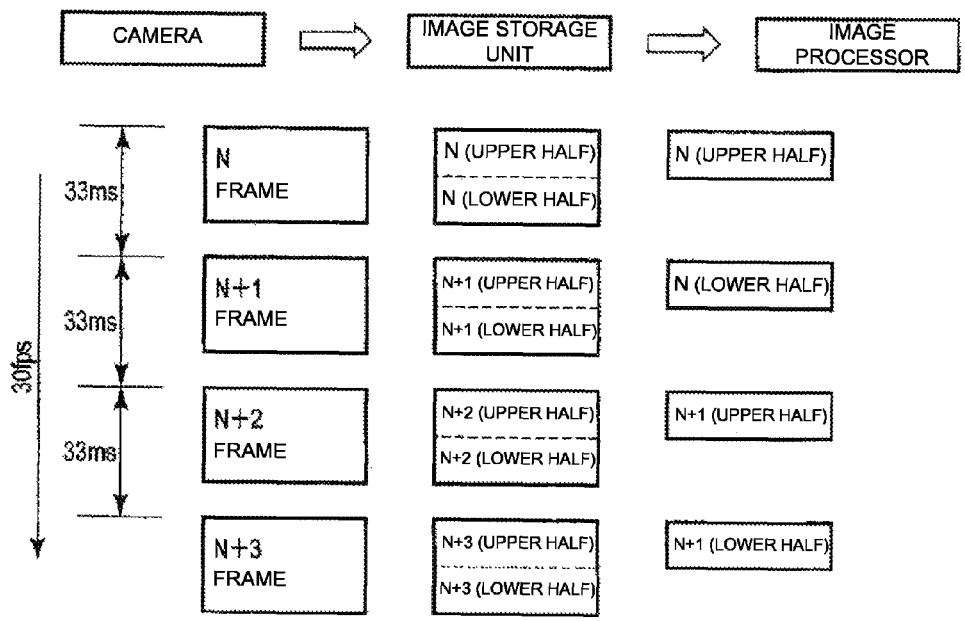
FIG. 2 is a schematic diagram illustrating a state of an image in each component and time according to the first embodiment.

For example, the image output controller 13 is implemented by executing a program, which is set in the image output controller 13 in advance, using the CPU 16. As illustrated in FIG. 2, the image output controller 13 has a function of dividing each frame image obtained from the camera 11 into at least two images including an upper image and a lower image with respect to a running direction of a vehicle and storing the divided images in the image storage unit 12, and a function of successively forwarding the divided images to the image processor 15 for each frame based on a result of determination of the inter-frame difference processor 14. The number of divided upper and lower images is not limited to two, and the image may be divided into three or more images. In addition, a direction in which the image is divided is not limited to a vertical direction, and the image may be divided in various directions. In addition, a division line is not limited to a straight line, and it is possible to use a curve or a combination of the straight line and the curve.

Figure 3:
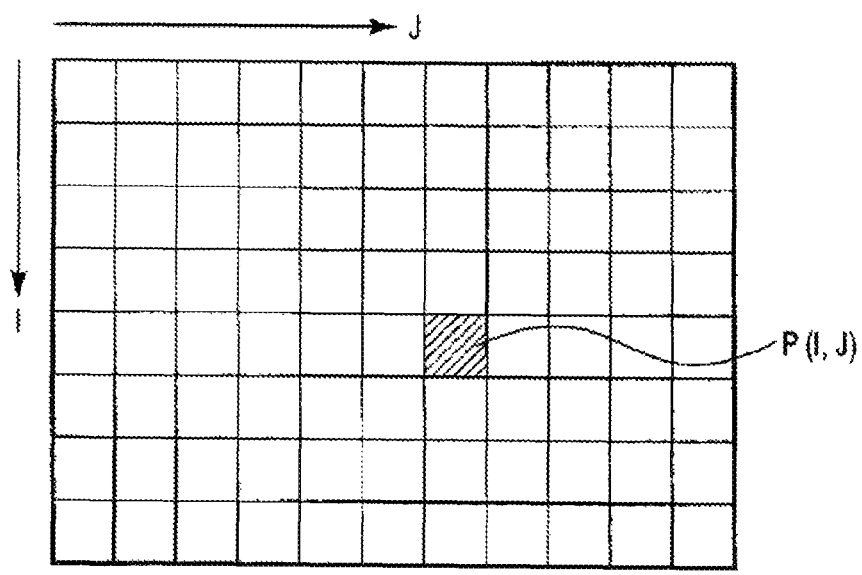
FIG. 3 is a schematic diagram illustrating a relation between pixels in horizontal and vertical directions of an image.

For example, the inter-frame difference processor 14 is implemented by executing a program, which is set in the inter-frame difference processor 14 in advance, using the CPU 16. First, image processing is performed to obtain an absolute value of a luminance difference between divided frame images successively fetched in the image storage unit 12. Here, when a luminance value of an image of an nth frame is expressed by Pn[i,j] (as illustrated in FIG. 3, i and j indicate an address of a pixel in the horizontal and vertical directions of an image), a difference image Qn may be calculated as below (Equation 1).

$$Qn[i,j]=|Pn[i,j]-Pn-1[i,j]| \quad \text{(Equation 1)}$$

Herein, a difference between n and n−1 is obtained. However, it is possible to perform devisal, such as calculation of a difference between n and n−k (k is variable by a condition) due to a condition of a speed of a subject.

Next, a difference Qn of every pixel is added in the image as in the following Equation 2.

$$R=\Sigma(0 \leq i < i\max, 0 \leq j < j\max)Qn[i,j] \quad \text{(Equation 2)}$$

Herein, imax indicates the number of pixels in the horizontal direction of the image, and jmax indicates the number of pixels in the vertical direction.

Finally, when Equation 3 below is satisfied using a threshold value T previously stored in the inter-frame difference processor 14, an inter-frame difference is determined to be present, and the result of determination is sent to the image output controller 13.

$$R>T \quad \text{(Equation 3)}$$

For example, the image processor 15 is implemented by executing a program, which is set in the image processor 15 in advance, by the CPU 16. The image processor 15 performs character recognition processing (recognition processing of a vehicle number) by divided images forwarded by the image output controller 13. Various schemes are publically known as the character recognition processing, and thus implementation may be achieved using the schemes.

Figure 5:
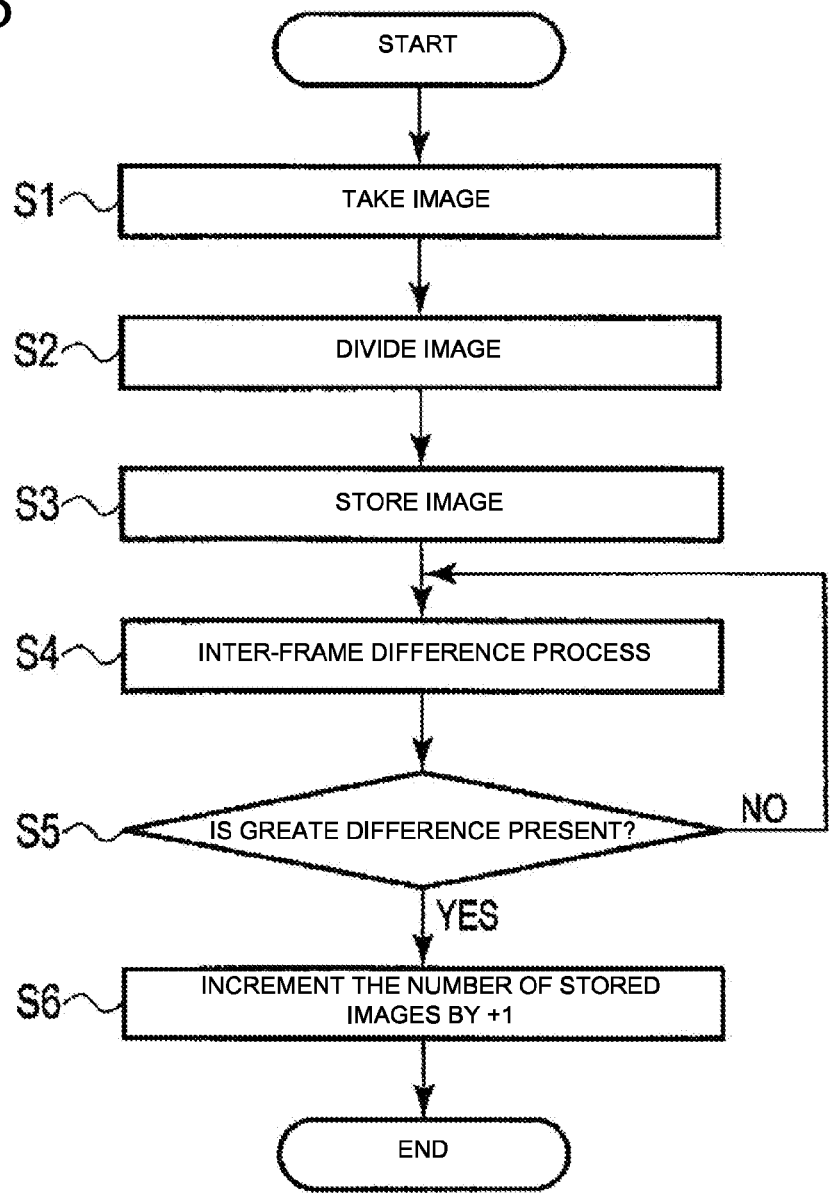
FIG. 5 is a flowchart illustrating an operation according to the first embodiment.
Figure 6:
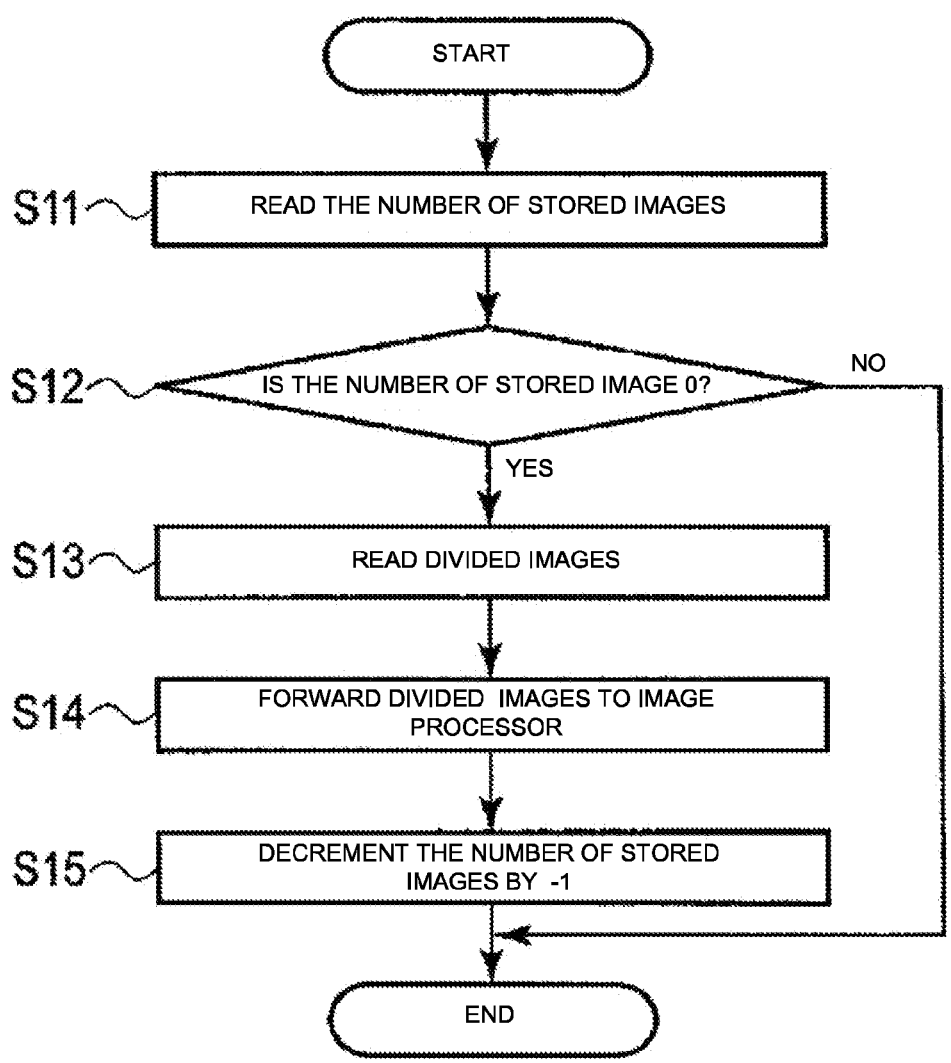
FIG. 6 is a flowchart illustrating an operation according to the first embodiment.

Next, in the above-described configuration, operations according to the first embodiment will be described with reference to flowcharts illustrated in FIGS. 5 and 6.

Figure 4:
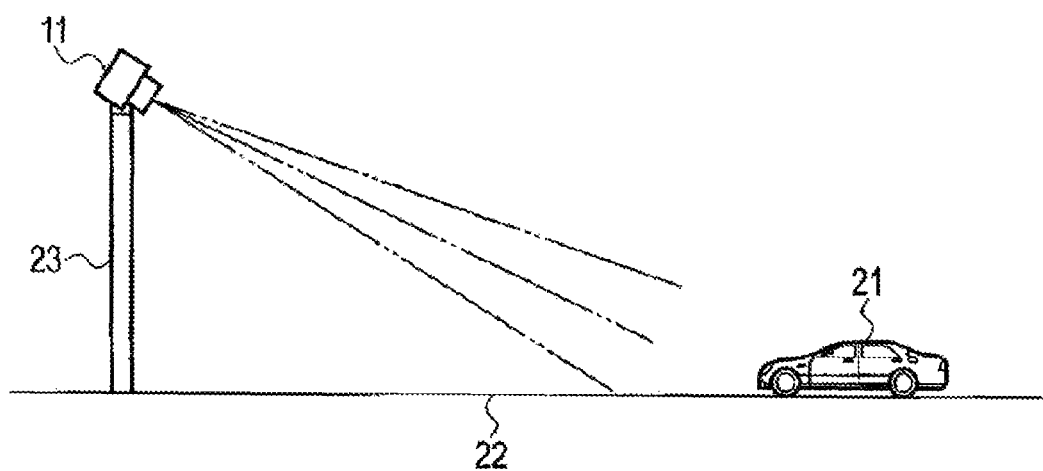
FIG. 4 is a schematic diagram illustrating an installation example of a camera according to the first embodiment.

Hereinafter, for example, as illustrated in FIG. 4, a description will be given of an operation using an example in which the camera 11 is installed on a pole 23 erected on a side of the road (toll collection lane) 22 on which a vehicle 21 runs, and an image of a vehicle number of the vehicle 21 coming from a distance on the road 22 is taken from a front.

First, for example, the camera 11 takes an image of the vehicle 21 moving from a right side of FIG. 4 from a front as an image of 2,000 pixels×1,000 pixels at a rate of 30 fps, and outputs the image as a frame image (step S1).

The frame image (hereinafter, also referred to as an image) obtained from the camera 11 is forwarded to the image output controller 13, divided into, for example, two frame images, each of which corresponds to 1,000 pixels× 1,000 pixels, in the vertical direction therein as illustrated in FIG. 2 (step S2), and stored in the image storage unit 12 (step S3).

Figure 7:
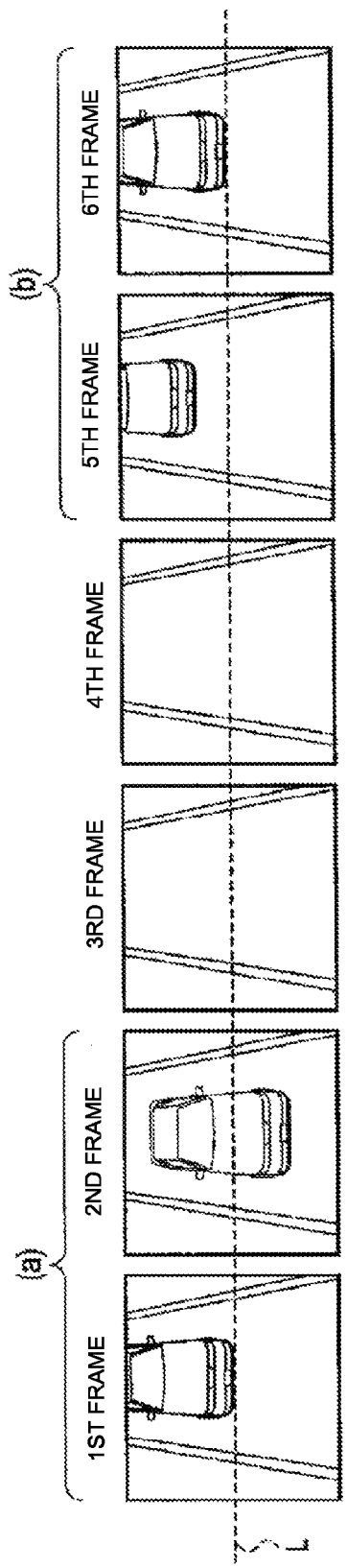
FIG. 7 is a schematic diagram illustrating an example of a frame image stored and divided in an image storage unit.

FIG. 7 illustrates an example of the divided frame images stored in the image storage unit 12. Referring to FIG. 7, a portion above a broken line L corresponds to the upper image, and a portion below the broken line L corresponds to the lower image.

The inter-frame difference processor 14 determines whether a difference greater than or equal to a threshold value is present between frame images by performing the processes of the above Equations 1 to 3 (inter-frame difference processing) on the divided images stored in the image storage unit 12. The inter-frame difference processor 14 outputs a determination result "1" when the difference greater than or equal to the threshold value is present, and outputs a determination result "0" when the difference greater than or equal to the threshold value is not present (steps S4 and S5). In this case, the inter-frame difference processing is successively performed on a first frame and a second frame, then the second frame and a third frame, and then the third frame and a fourth frame and the like. In addition, the inter-frame difference processing is performed on between upper images and between lower images.

Referring to the specific example of FIG. 7, when the processes of the above Equations 1 to 3 are performed, while great differences are present between upper images and between lower images in the first frame and the second frame of (a), a great difference is present only between upper images in a fifth frame and a sixth frame of (b).

Next, the inter-frame difference processor 14 updates the number of stored images saved in an internal memory (not illustrated) based on the result of determination (step S6). In other words, the number of stored images is incremented by "+1" when a difference greater than or equal to the threshold value is present, and the operation returns to step S4 when a difference greater than or equal to the threshold value is not present. Referring to the specific example of FIG. 7, the number of stored images of (a) is incremented by 2 since the upper image and the lower image of the second frame are different from the upper image and the lower image of the first frame, respectively. In addition, the number of stored images of (b) is incremented by 1 since the lower image of the sixth frame is not different from the lower image of the fifth frame even though the upper image of the sixth frame is different from the upper image of the fifth frame.

Next, the image output controller 13 reads the number of stored images saved in the internal memory of the inter-frame difference processor 14 (step S11), and determines whether the value is "0" (step S12). The image output controller 13 ends the process when the value is "0", and reads the divided images at a frame rate of 30 fps from the image storage unit 12 (step S13) and forwards the divided images to the image processor 15 (step S14) when the value is not "0".

Herein, FIG. 8 illustrates a specific example of divided images ("UP" refers to an upper image, and "LO" refers to a lower image) stored in the image storage unit 12, the presence/absence of a difference between frames ("0" refers to the absence of a difference, and "1" refers to the presence of a difference), the number of stored images, and a state of a forwarded image. The examples corresponds to the specific example of FIG. 7, and indicates a case in which great differences are present between upper images and between lower images in the first frame and the second frame, and a great difference is present only between upper images in the fifth frame and the sixth frame.

In the specific example, the upper image of the second frame is forwarded to the image processor 15 in the second frame, the lower image of the second frame is forwarded to the image processor 15 in the third frame, the upper image of the third frame is forwarded to the image processor 15 in the fourth frame, and the lower image of the third frame is forwarded to the image processor 15 in the fifth frame. A difference between the upper images and a difference between the lower images are not present in the image of the fourth frame, and thus both the upper image and the lower image of the image of the fourth frame are not forwarded. As a result, as an image forwarded in the sixth frame, the upper image of the fifth frame is forwarded to the image processor 15.

Next, the image output controller 13 decrements the number of stored images by 1 (step S15), and ends the process. In the specific example of FIG. 8, the number of stored images in the second frame is two because a difference between upper images and a difference between lower images are present in the images of the first frame and the first frame. In addition, the number of stored images in the third frame is three because a difference between upper images and a difference between lower images are present in the images of the third frame and the second frame, and one image is forwarded in the second frame.

The image processor 15 performs character recognition processing (recognition processing of a vehicle number) using the divided images forwarded by the image output controller 13. Various schemes are publically known as the character recognition processing, and thus it is possible to use the schemes.

As described above, an unnecessary image is not sent to the image processor 15 when an image is divided and subjected to difference processing, and thus it is effective in noticeably reducing a load of image processing. Moreover, a period of time in which a difference is not present may be used to forward an image. Thus, even when an image has a high resolution, the image may be forwarded to the image processor 15 without a great time delay. Even when there is much traffic on a road in daytime, and a period of time at which a difference is not present is short, an image is forwarded during a period of time at which there is less traffic at night. Thus, the present device may be implemented.

Next, a second embodiment will be described.

An overall configuration of a license plate reader according to the second embodiment is similar to that of the first embodiment described above, and thus a description thereof will be omitted. A description will be given of an image output controller 13 which is different from that of the first embodiment.

The image output controller 13 is different from that of the first embodiment in a method of dividing a frame image obtained from the camera 11. In the first embodiment (FIG. 2), an image is spatially divided into an upper image and a lower image. However, in the second embodiment, an image is divided into at least two images, each of which corresponds to 6 bits, with respect to a gradation direction of a digital output (12 bits) of the camera 11.

Figure 9:
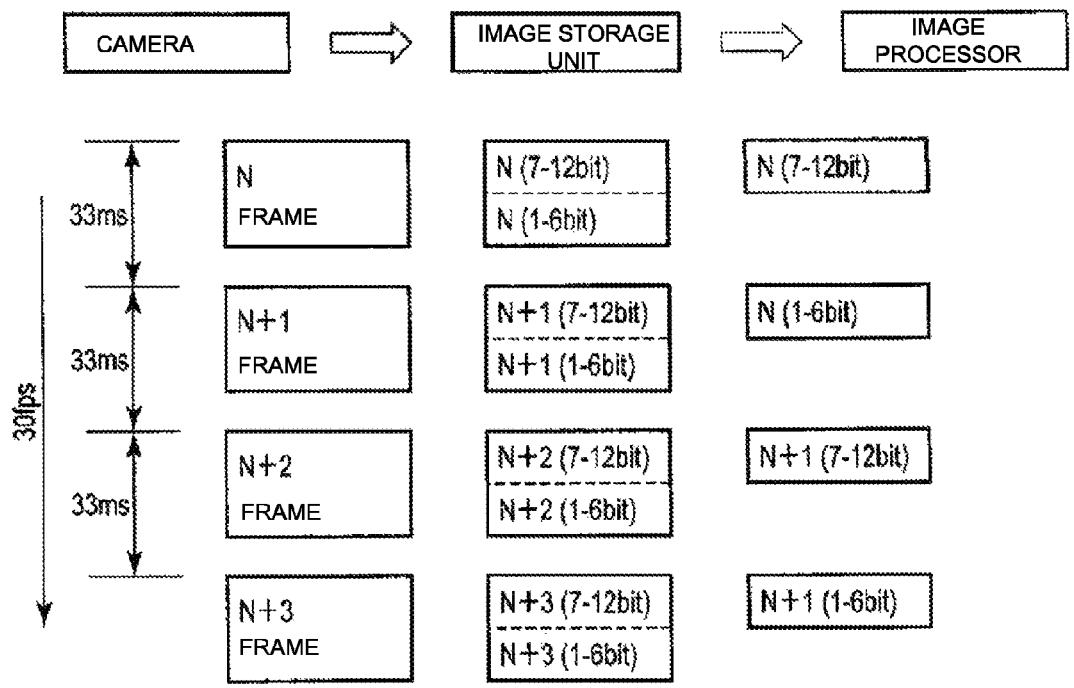
FIG. 9 is a schematic diagram illustrating a state of an image in each component and time according to a second embodiment.

Specifically, for example, as illustrated in FIG. 9, an image is divided into two images corresponding to an image of upper 6 bits (7 to 12 bits) and an image of lower 6 bits (1 to 6 bits). A capacity of each of the divided images is similar to that of the first embodiment, and processes subsequent to image division are also similar to those of the first embodiment.

As described above, when an image is divided in a brightness direction by the image output controller 13, for example, only an image of lower bits is forwarded with few changes in upper bits at night. Therefore, it is effective in sending a high-resolution image of 30 fps at a high resolution without change.

Next, a third embodiment will be described.

An overall configuration of a license plate reader according to the third embodiment is similar to that of the first embodiment described above, and thus a description thereof will be omitted. A description will be given of an image output controller 13 which is different from that of the first embodiment.

Figure 10:
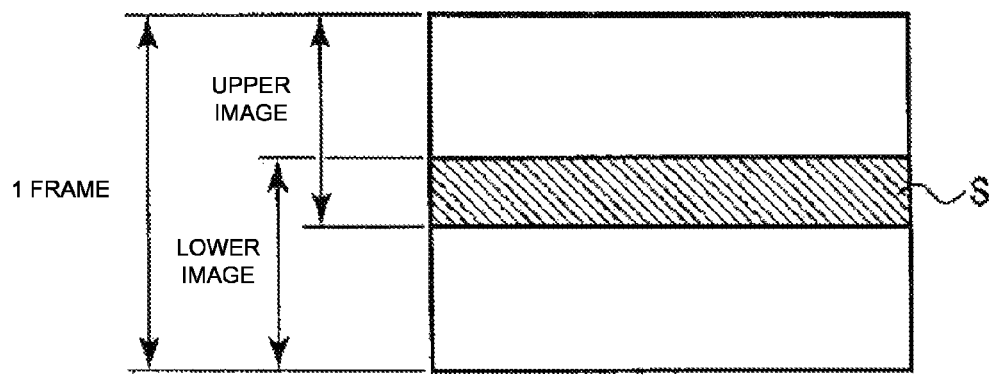
FIG. 10 is a schematic diagram illustrating image division according to a third embodiment.

The image output controller 13 is different from that of the first embodiment in a method of dividing a frame image obtained from the camera 11. In the first embodiment (FIG. 2), an image is spatially divided into an upper image and a lower image. However, in the third embodiment, as illustrated in FIG. 10, an image is divided into an upper image and a lower image such that the upper image and the lower image overlap each other in a center region S of the frame image by predetermined bits. In this way, it is possible to reduce a risk that a portion of a license plate (vehicle number) will be divided into upper and lower images.

The above description may be similarly applied to the second embodiment.

According to the vehicle number image pickup device of at least one of the above-described embodiments, vehicle detection for taking an image of a vehicle number needs to be performed in real time, and thus it is considered difficult to perform complex processing and impossible to perform accurate detection. However, the present embodiment is superior to the conventional art in that concise processing equivalent to a conventional one may be realized and a period of time corresponding to an idle time in the past at which there is no running vehicle may be effectively used by dividing an input image from a high-resolution, high-speed and high-bit camera to obtain a capacity equivalent to a conventional one and stock the input image, and providing only an image region having a difference (a suspected vehicle) to an image processing side.

Therefore, even when an image is taken by a high-speed, high-resolution, and high-dynamic range camera, a vehicle number may be accurately and concisely read through general image processing using a mechanism in which an image obtained when a vehicle approaches is divided and forwarded.

In the above embodiment, a description is given of a case in which a frame image from the camera 11 is divided into two images with respect to the running direction of the vehicle. However, the description may be similarly applied even when the image is divided into two or more images.

Even though some embodiments of the invention have been described, the embodiments are proposed as examples and not intended to restrict the scope of the invention. The embodiments may be implemented in various other forms and omitted, replaced, and changed within the scope not departing from the spirit of the invention. The embodiments and modifications thereof are included in a range of the invention described in the claims and an equivalent thereof as the embodiments and modifications are included in the scope and the spirit of the invention.

What is claimed is:

1. An image pickup device comprising:
an image pickup means for taking an image including a vehicle number for identifying a vehicle running on a road in a predetermined frame period;
an image division means for dividing each of frame images obtained from the image pickup means into at least an upper image and a lower image with respect to a running direction of the vehicle;
a difference processing means for determining whether an inter-frame difference is present between the upper images of different frames and determining whether an inter-frame difference is present between the lower images of different frames; and
an image output means for successively outputting one of the upper images which were determined to have the inter-frame difference by the difference processing means, and one of the lower images which were determined to have the inter-frame difference by the difference processing means, for each frame, to an image processor;
wherein the image division means divides each of the frame images into at least the upper image and the lower image such that the upper image and the lower image overlap each other in a center region of the frame image.

2. A vehicle number image pickup device comprising:
an image pickup means for taking an image including at least a vehicle number from a front or a rear of a vehicle running on a road in a predetermined frame period, and outputting the image as a digitized frame image;
an image division means for dividing each of digitized frame images obtained from the image pickup means into at least an image of upper bits and an image of lower bits with respect to a gradation direction of a digital output of the image pickup means;
a difference processing means for determining whether an inter-frame difference is present between the images of upper bits of different frames and determining whether an inter-frame difference is present between the images of lower bits of different frames; and
an image output means for successively outputting one of the upper bits images which were determined to have the inter-frame difference by the difference processing means, and one of the lower bits image which were determined to have the inter-frame difference by the difference processing means, to an image processor, for each frame, to an image processor.

3. An image pickup method comprising:
taking an image including a vehicle number for identifying a vehicle running on a road in a predetermined frame period;
dividing each of frame images obtained as a result of taking the image into at least an upper image and a lower image with respect to a running direction of the vehicle;
determining whether an inter-frame difference is present between the upper images of different frames and determining whether an inter-frame difference is present between lower images of different frames; and
outputting successively one of upper images which were determined to have the inter-frame difference, and one of the lower images which were determined to have the inter-frame difference, for each frame;
wherein each of the frame images is divided into at least the upper image and the lower image such that the upper image and the lower image overlap each other in a center region of the frame image.

* * * * *